Figure 1:
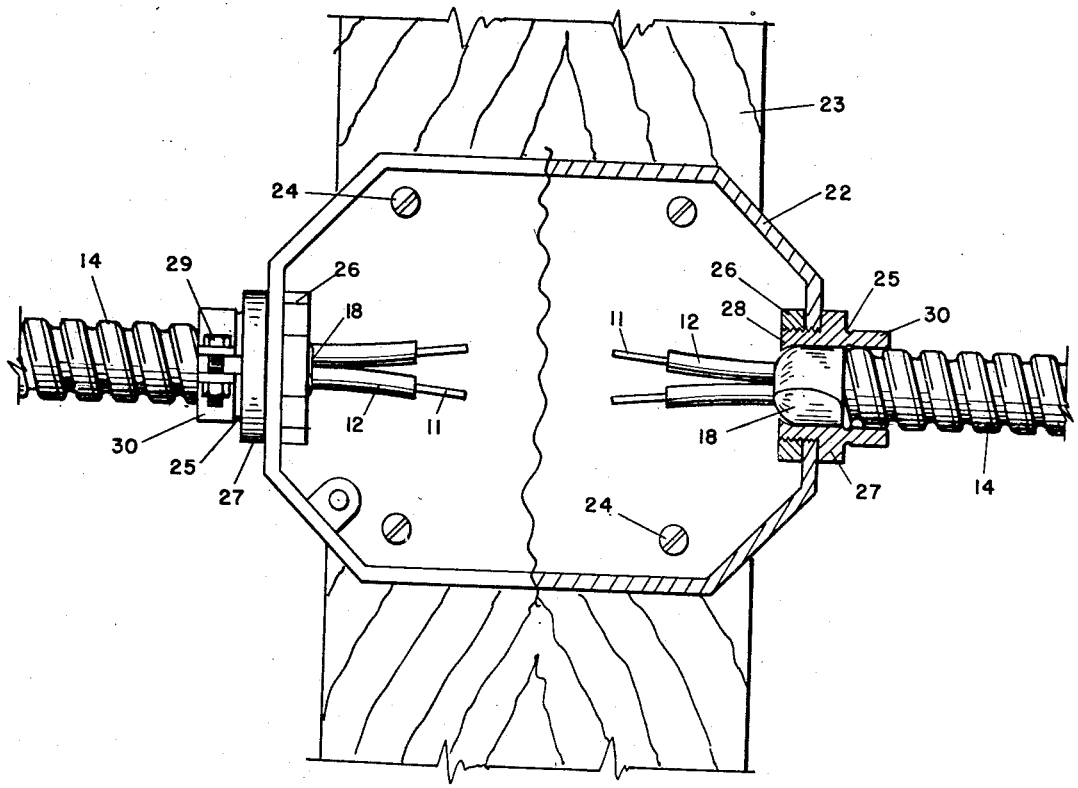

June 10, 1941.   W. A. WHITTAKER   2,245,422
ARMORED ELECTRIC CABLE
Filed Aug. 30, 1939

INVENTOR
WILLIAM A. WHITTAKER
BY
ATTORNEY

Patented June 10, 1941

2,245,422

UNITED STATES PATENT OFFICE 2,245,422

ARMORED ELECTRIC CABLE

William A. Whittaker, Dobbs Ferry, N. Y., assignor to Anaconda Wire & Cable Company, New York, N. Y., a corporation of Delaware Application August 30, 1939, Serial No. 292,546

4 Claims. (Cl. 174—78)

This invention relates to that type of insulated electric conductor in which the metallic conductor, which is coated with a layer of compound having dielectric properties, is enclosed within a wrapping of helically applied metallic strip to provide mechanical protection, the turns of the metallic armor thus formed being interlocked so that the completed armor will not pull apart under tensile stress.

In the manufacture of electric cable of this type it is usual, and in fact is required by many of the building codes, to insert a layer of tough paper or similar fibrous material between the insulated conductors and the outer metallic armor. The purpose of this wrapping is of course to protect the rubber or other insulating compound from abrasion or cutting by the metallic sheath. However the weakest point in an installation made with this type of conductor is at the point where the outer metallic armor terminates. In order to make the electrical connections it is of course necessary to strip back the outer sheath for a distance which varies from 3 to 10 inches, so that the insulated conductors will be exposed. Because a hacksaw is invariably used in cutting off the armor the resulting edge is raw and jagged and there is danger that the rubber insulation on the wires will be cut if the wires are bent back so that the insulation is pressed against this rough edge. It has been proposed in the past to protect the insulated wires at this point by inserting a bushing which consists of a small cylinder, usually formed of vulcanized fiber which is of the proper size to slip between the conductors and the armor and thus protect the wires from the armor at the termination of the sheath. A bushing of this type is generally satisfactory when installed, but the chief difficulty has been the fact that it is difficult to insert a bushing of even the thinnest fiber between the conductor and the outer sheath, as the latter must grip the former firmly and tightly. If the armor is applied loosely, leaving room for the easy insertion of a bushing, the cable will not pass one of the routine tests which is to support a ten foot length of the cable at one end by a clamp around the outer sheath. The conductors are then exposed at the other end of the cable and a weight of forty pounds is hung from them. Naturally, the conductors will pull out from within the armor if the latter is not tightly applied and this constitutes a failure and justifies rejection of the cable. In consequence, a cable which will pass this test must have its armor applied so tightly to the conductors that the insertion of a bushing between the insulated wires and the armor will be most difficult even with the various expedients which have been proposed of withdrawing the paper wrapping beneath the sheath or using a paper separator at this point which may be thinned down by a lengthwise pull leaving a space for the insertion of the bushing.

It is the chief object of this invention to provide a collar for use with armored cable of this type which will prevent the conductors from coming in contact with the jagged end of the armor and which at the same time is not inserted between the armor and the conductors. A further object of this invention is to provide a type of protective collar which will be so easily applied that it will be invariably installed by the electrician and not thrown away to avoid the nuisance of slipping a tightly fitting bushing in place.

The invention is fully disclosed in the accompanying drawing and the following description, in which like reference numerals indicate similar parts and in which Figure 1 is a plan view of a complete armored cable installation using a type of collar made in accordance with this invention.

Figure 2:
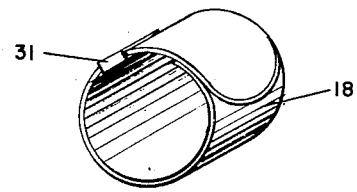

Figure 2 is a perspective view of the collar shown in Figure 1.

Referring to Figures 1 and 2 in the drawing, a metallic conductor 11 is provided with a layer of insulating compound 12 which usually consists at least in part of rubber or a resinous material of similar characteristics. The conductors so insulated are twisted together to form either a twisted pair or a larger number of wires and a paper strip may then be wrapped about the conductors. Preferably the strip is applied to the conductors in an approximately longitudinal direction and the width of the strip is slightly greater than the perimeter of the assembled wires so that there will be a small overlap. After the paper has been folded over the conductors, the outer metallic armor 14 is applied helically with a conventional armoring machine which will interlock the adjacent convolutions of metallic strip. This armor is well known to the electrical industry and needs no further description.

When installing armored cable the electrician cuts off a piece at a point which will give him a sufficient length of conductor. He then cuts through the armor about six inches back from the end of the cable and removes this much of the outer sheath 14, leaving the insulated conductors with their wrapping of paper. The paper may then be torn off back to the end of the armor and the collar 18 is slipped over the insulated conductors.

The collar 18 comprises essentially an armor-gripping skirt and a constricted wire-gripping neck. The collar may be made up from a sheet of vulcanized fiber or similar material and molded to shape, the two lateral edges of the skirt overlapping to completely enclose the armor and, because the unrestrained internal diameter of the skirt is considerably less than the external diameter of the armor 14, will grip it firmly when snapped over it. The tension of the vulcanized fiber on the armor is such as to prevent any movement of the wires 12 behind the wire-gripping neck. The advantage of the split collar is that it more readily adapts itself to variations in diameter of the outer sheath than would a solid collar and, in addition may be snapped over the wires instead of being threaded over them.

Illustrated in Figure 1 is an outlet box 22 of the sort frequently used in domestic installations. The box, usually made of heavy stamped metal, is secured to the studding of the structure 23 by appropriate screws 24. When the installation is completed a cover plate (not shown) will be fastened to the box and it will carry a switch, lighting receptacle, outlets, fuses or similar fittings. Regardless of the particular appliance which will be fitted to the cover plate the box will appear much as shown in Figure 11 before the final connections are made.

Each of the faces of the box are fitted with knockouts so that an opening for the entrance of the armored cable may be made with a hammer blow. The threaded end of the metal connector bushing 25 is inserted into the wall of the box and held in place by the nut 26 which draws the shoulder 27 firmly against the wall of the box. The armored cable may now be slipped into the connector bushing 25, the protecting collar 18 having been previously snapped in place. It is desirable that the throat of the connector bushing be constricted so as to form the shoulder 28. If the armored cable is thrust firmly into the connector 25 the collar 18 will be rigidly held between the shoulder and the armor 14 and there will be no possibility of the insulation 12 wearing against the rough end of the armor. The screw 29 may now be tightened, drawing the two lips of the clamp 30 together and holding the cable securely in place.

It may be noted that the clamp 30 when tightened must grip the armor 14 tightly in order to ground the box 22. For this reason the collar 18 must be short enough, as shown, so that it will not extend back between armor and clamp and thus insulate one from the other.

To absolutely prevent any possibility of insulating the armor from the box to which it is connected, the collar 18 is fitted with a short strip of metal 31 which has been bent back upon itself and is clipped over the edge of the skirt of the collar 18. In this way a positive electrical connection will be assured between a cable within the collar and a connector bushing outside since that portion of the strip on the interior of the collar will contact the armor while that on the exterior will be in contact with the connector.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

What I claim is:

1. An electric cable installation comprising an insulated electric conductor enclosed within a flexible metallic armor, an insulating collar applied to the exterior of said armor, said collar being formed of fibrous sheet material shaped to form a cylindrical skirt and a constricted neck, said collar being, in turn, enclosed within a metallic connector, and electrically connected contacts positioned on the inner and outer surfaces of the skirt of said collar, said contacts being effective to complete the electrical circuit between said metallic armor and said connector.

2. The electric cable installation of claim 1 in which the contacts positioned on the inner and outer surfaces of the skirt consist of a strip of metal bent to form a letter U, the legs of the bent strip lying on the interior and exterior surfaces of the skirt.

3. A protective collar adapted to prevent contact between electric conductors and the sharp end of the enclosing armor comprising a skirt and a restricted neck, said skirt being formed of electrically insulating fibrous sheet material adapted to overlie a portion of the armor and to be held between the armor and a surrounding clamp and a single continuous strip of metal covering a portion of both the inner and outer faces of said skirt, said strip being effective to maintain said armor and said clamp at the same electric potential.

4. A collar adapted to prevent abrasion between the insulation of electric conductors and the sharp end of the enclosing helically applied metallic armor comprising a skirt and a restricted neck, the skirt being formed of vulcanized fiber and being designed to overlie and enclose the portion of the armor, the skirt being gripped between the armor and a surrounding connector, and a single conductor element exposed on both the inner and outer faces of said skirt, said element being effective to maintain the armor and the connector at the same electric potential.

WILLIAM A. WHITTAKER.